US012270524B2

(12) United States Patent
Hlavach et al.

(10) Patent No.: US 12,270,524 B2
(45) **Date of Patent: *Apr. 8, 2025**

(54) VEHICLE LIGHTING WITH THERMAL CONTROL

(71) Applicant: Magna Exteriors Inc., Aurora (CA)

(72) Inventors: Mark Christopher Hlavach, Aurora (CA); Abishek Sadhu Anchan, Aurora (CA)

(73) Assignee: Magna Exteriors Inc., Aurora (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/351,594

(22) Filed: Jul. 13, 2023

(65) Prior Publication Data

US 2023/0358386 A1 Nov. 9, 2023

Related U.S. Application Data

(63) Continuation of application No. 17/606,153, filed as application No. PCT/CA2020/050645 on May 12, 2020, now Pat. No. 11,746,986.

(Continued)

(51) Int. Cl.

*F21V 29/83* (2015.01)
*F21S 41/19* (2018.01)

(Continued)

(52) U.S. Cl.

CPC ............ *F21S 45/43* (2018.01); *F21S 41/192* (2018.01); *F21S 45/47* (2018.01); *F21S 45/49* (2018.01);

(Continued)

(58) Field of Classification Search

CPC ........ F21V 29/83; F21V 29/67; F21V 29/677; F21V 29/673; F21S 45/43; F21S 45/435;

(Continued)

(56) References Cited

U.S. PATENT DOCUMENTS 6,910,794 B2 6/2005 Rice
7,210,832 B2 5/2007 Huang (Continued)

FOREIGN PATENT DOCUMENTS

CN 201344503 Y * 11/2009
CN 202024294 U * 11/2011

(Continued)

OTHER PUBLICATIONS

Search English translation of CN-201344503-Y (Year: 2009).*

(Continued)

*Primary Examiner* — Omar Rojas Cadima
(74) *Attorney, Agent, or Firm* — Dickinson Wright PLLC

(57) ABSTRACT

A vehicle lighting assembly includes a solid state light emitter mounted on a first side of a substrate. A second side of the substrate is connected or adjacent to a heatsink. The heatsink may have a lower thermal conductivity than the second side of the substrate. A blower fluidly engages with the heatsink to flow fluid, e.g., air, through passages in the heatsink. The heatsink can include at least one aperture such that the moving fluid from the blower contacts at least a portion of the second side of the substrate.

19 Claims, 10 Drawing Sheets

Related U.S. Application Data

(60) Provisional application No. 62/848,303, filed on May 15, 2019.

(51) Int. Cl.
*F21S 45/43* (2018.01)
*F21S 45/47* (2018.01)
*F21S 45/49* (2018.01)
*F21W 107/10* (2018.01)

(52) U.S. Cl.
CPC ......... *F21V 29/83* (2015.01); *F21W 2107/10* (2018.01)

(58) Field of Classification Search
CPC .................. F21S 41/295; F21S 41/147; F21W 2107/10; H05K 7/20972
See application file for complete search history.

(56) References Cited

U.S. PATENT DOCUMENTS

| | | | | |
|---|---|---|---|---|
| 7,329,033 | B2 | 2/2008 | Glovatsky et al. | |
| 7,427,152 | B2 | 9/2008 | Erion et al. | |
| 7,510,303 | B2 | 3/2009 | Jonsson et al. | |
| 7,683,395 | B2 | 3/2010 | Huber et al. | |
| 7,932,532 | B2 | 4/2011 | Pickard et al. | |
| 8,047,695 | B2 | 11/2011 | Inoue | |
| 8,118,462 | B2 | 2/2012 | Inoue et al. | |
| 8,899,803 | B2 | 12/2014 | Marley | |
| 9,134,003 | B2 | 9/2015 | Inoue et al. | |
| 10,030,838 | B2 | 7/2018 | Kim et al. | |
| 11,746,986 | B2 * | 9/2023 | Hlavach | F21S 45/49 362/294 |
| 2007/0035957 | A1 | 2/2007 | Albou et al. | |
| 2010/0133578 | A1 | 6/2010 | Pickard et al. | |
| 2011/0051414 | A1 * | 3/2011 | Bailey | F21V 19/001 362/235 |
| 2011/0134239 | A1 * | 6/2011 | Vadai | F21V 23/06 313/46 |
| 2011/0310631 | A1 | 12/2011 | Davis | |
| 2012/0092870 | A1 | 4/2012 | Tralli | |
| 2014/0098538 | A1 * | 4/2014 | De Vaal | F21V 29/508 362/249.02 |
| 2017/0219182 | A1 | 8/2017 | Duarte et al. | |
| 2017/0317257 | A1 | 11/2017 | Ezaki et al. | |

FOREIGN PATENT DOCUMENTS

| | | | | |
|---|---|---|---|---|
| CN | 102374433 | A | * | 3/2012 |
| CN | 202902035 | U | | 4/2013 |
| CN | 103836478 | A | | 6/2014 |
| CN | 203628355 | U | * | 6/2014 |
| CN | 203836680 | U | | 9/2014 |
| CN | 109386779 | A | | 2/2019 |
| CN | 208768352 | U | | 4/2019 |
| EP | 1643188 | A1 | | 4/2006 |
| JP | 2006235399 | A | * | 9/2006 |
| JP | 2019061913 | A | | 4/2019 |
| KR | 20090014153 | A | * | 2/2009 |
| TW | 201122341 | A | * | 7/2011 |

OTHER PUBLICATIONS

Search English translation of CN-202024294-U (Year: 2011).*
Search English translation of JP-2006235399-A (Year: 2006).*
Search English translation of KR-20090014153-A (Year: 2009).*
Search English translation of TW-201122341-A (Year: 2009).*
Search English translation of CN-203628355-U (Year: 2013).*
Search English translation of CN-102374433-A (Year: 2011).*
Office Action regarding corresponding CN App. No. 202080035403.3; issued Dec. 10, 2023.
Decision of Rejection regarding corresponding CN App. No. 202080035403.3; dated Jul. 16, 2024.

* cited by examiner

VEHICLE LIGHTING WITH THERMAL CONTROL

CROSS-REFERENCE TO RELATED APPLICATIONS

The present application is a continuation of U.S. patent application Ser. No. 17/606,153, filed Oct. 25, 2021, which claims the benefit of International Patent Application No. PCT/CA2020/050645, filed May 12, 2020, which claims the benefit of U.S. Patent Application Ser. No. 62/848,303, filed on May 15, 2019, the contents of which are hereby incorporated by reference in their entirety herein.

FIELD

The present disclosure relates to generally to vehicle lighting with thermal control, and more specifically, to a lighting assembly with a heatsink.

BACKGROUND

Modern vehicle lighting includes emitters that produce heat that needs to be discharged from the light.

SUMMARY

This section provides a general summary of the present disclosure and is not a comprehensive disclosure of its full scope or all of its features, aspects and objectives.

The present disclosure provides a vehicle lighting assembly including at least one light emitter; and a substrate having a first side on which the at least one light emitter is mounted, and a second side remote from the first side and including a thermally conductive material. The vehicle lighting assembly also includes a heatsink adjacent the second side of the substrate, the heatsink including a base defining a surface extending in a flat plane parallel to and spaced apart from the second side of the substrate with a thermal interface material disposed therebetween. The base defines an aperture exposing a portion of the second side of the substrate.

In some embodiments, the vehicle lighting assembly further includes a blower fluidly engaged with the heatsink to drive air through the heatsink, into the aperture and across the portion of the second side of the substrate.

In some embodiments, the thermally conductive material includes at least one of: a metal film, a metal plate, copper, copper alloy, aluminum, and aluminum alloy.

In some embodiments, the thermal interface material includes at least one of: a thermal paste, a thermal grease, a thermal gap filler, and a thermal adhesive.

In some embodiments, the aperture is axially aligned with the light emitter that is positioned on the first side of the substrate.

In some embodiments, the heatsink includes a plurality of fins extending outwardly from the aperture and a plurality of channels intermediate the plurality of fins.

In some embodiments, the plurality of fins have an arcuate shape.

In some embodiments, the heatsink includes a plurality of fins extending outwardly from the aperture and a plurality of channels intermediate the plurality of fins and wherein the blower forces air through the plurality of channels.

In some embodiments, the light emitter is chosen from a light emitting diode, a high-intensity discharge lamp, a type of electrical gas-discharge lamp, and a laser emitter.

In some embodiments, the substrate is a printed circuit board, and the light emitter includes a light emitter heatsink on the first side of the substrate and is connected to the second side through conductive components chosen from traces on the substrate and a via extending through the substrate from the first side to the second side.

In some embodiments, the second side of the substrate has a higher thermal conductivity than the heatsink.

In some embodiments, the vehicle lighting assembly further includes a reflector mounted at the first side of the substrate and adapted to direct light from the light emitter; and a lens configured to receive light from the reflector and output light therefrom.

The present disclosure also provides a vehicle lighting assembly that includes: at least one light emitter; and a substrate having a first side on which the at least one light emitter is mounted, and a second side remote from the first side and including a thermally conductive material. The vehicle lighting assembly also includes a heatsink adjacent the second side, the heatsink including a base defining a surface extending in a flat plane parallel to the second side of the substrate. The base defines an aperture exposing a portion of the second side of the substrate. The heatsink includes a plurality of fins extending from the surface of the base.

In some embodiments, the vehicle lighting assembly further includes a blower fluidly engaged with the heatsink to drive air through the heatsink, into the aperture and across the portion of the second side of the substrate.

The present disclosure also provides a vehicle headlamp assembly that includes: a printed circuit board (PCB) having a first side and a second side opposite the first side; at least one light emitting diode (LED) mounted to the first side of the PCB and configured to emit light; and a heatsink contacting the second side of the PCB and configured to dissipate heat generated by the LED, the heatsink including a base defining a surface extending in a flat plane parallel to the second side of the PCB, the base defining an aperture exposing a portion of the second side of the PCB.

In some embodiments, the heatsink further includes a plurality of fins extending from the surface of the base and defining venting passages.

In some embodiments, the vehicle headlamp assembly further comprises a fan including an inlet and an outlet, the fan drawing in air through the inlet and discharging air through the outlet, wherein outlet of the fan is configured to direct the discharged air through the aperture towards the second side of the PCB and through the venting passages.

In some embodiments, the plurality of fins are arcuate and arranged to originate from positions along a periphery of the aperture and extend toward a periphery of the base.

In some embodiments, the vehicle headlamp assembly further comprising metal positioned on a substantial portion of the second side of the PCB, and a thermal interface material disposed between a first portion of the metal between the first portion and the heatsink.

In some embodiments, the thermal interface material includes at least one of: a thermal paste, a thermal grease, a thermal gap filler, and a thermal adhesive.

Some of above aspects of the disclosure describe a lighting structure relating to a vehicle, e.g., a vehicle headlamp. However, the present disclosure is not limited to headlamps.

BRIEF DESCRIPTION OF THE DRAWINGS

Advantages of the present disclosure will be readily appreciated, and become better understood by reference to the following detailed description when considered in connection with the accompanying drawings wherein.

DETAILED DESCRIPTION OF EXAMPLE EMBODIMENTS

In general, example embodiments of lights with heatsinks in accordance with the teachings of the present disclosure will now be disclosed. The example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms, and that they should not be construed to limit the scope of the present disclosure. In some example embodiments, well-known processes, well-known device structures, and well-known technologies are not described in detail, as they will be readily understood by the skilled artisan in view of the disclosure herein.

Figure 1:
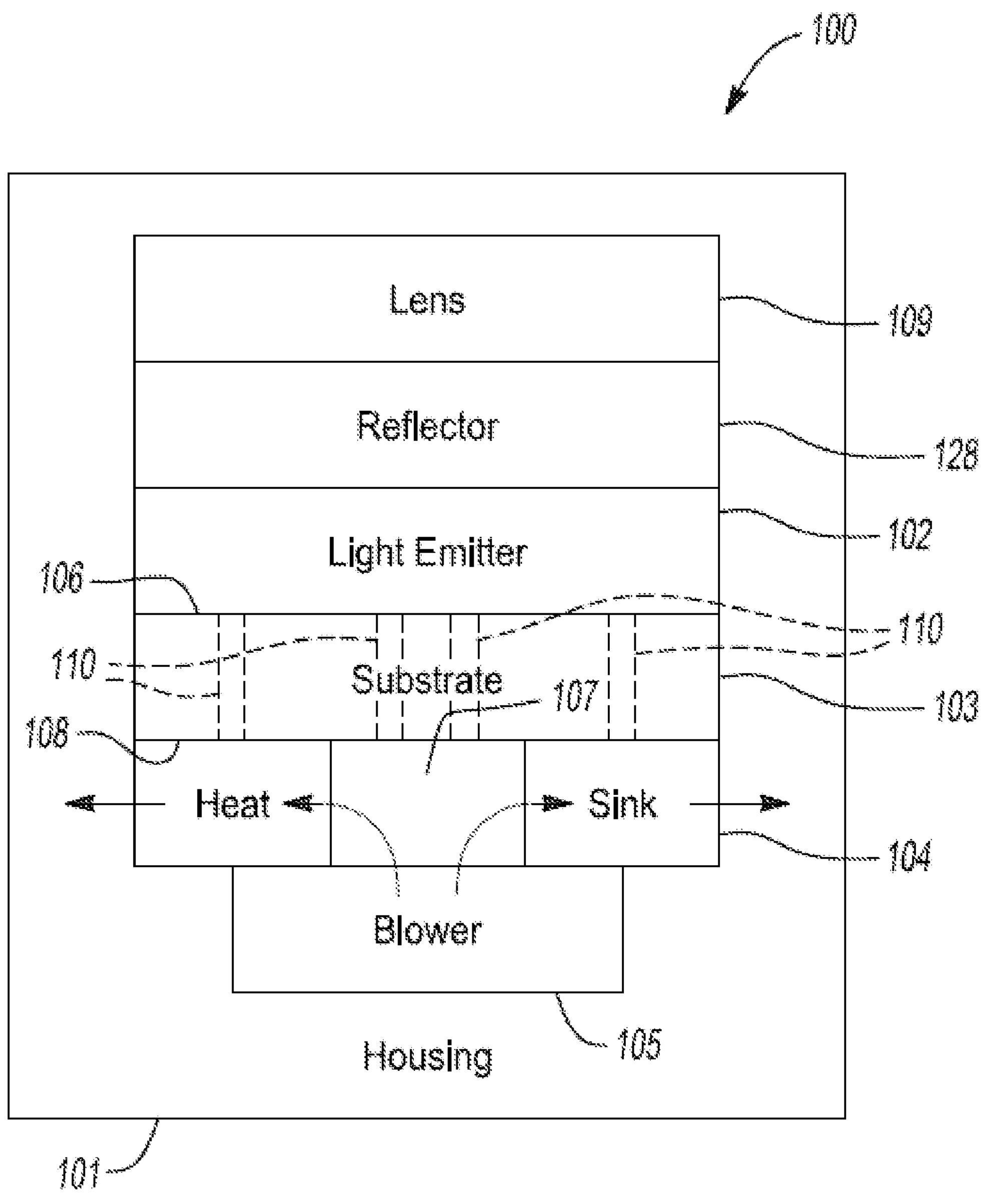
FIG. 1 is a schematic view of a lighting assembly in accordance with the disclosure.

FIG. 1 shows a light assembly 100 including a housing 101 in which a light emitter 102 is positioned. The light assembly 100 can be a vehicle headlamp assembly, e.g., a light assembly configured to be a headlamp of a vehicle. A vehicle headlamp can be used to illuminate the forward travel path of a vehicle and, in some use cases, emits the most light as compared to other vehicle lights.

The housing 101 provides an enclosure to protect the components positioned therein from the elements and weather. The light emitter 102 is solid state device, e.g., a light emitting diode (LED) in an example embodiment. The light emitter 102 can be a high-intensity discharge lamp or a type of electrical gas-discharge lamp which produces light by means of an electric arc between electrodes housed inside a translucent or transparent fused quartz or fused alumina arc tube. The light emitter 102 can be a laser emitter, e.g., laser diode, in an example embodiment. The light emitter 102 can be single packaged device or a plurality of devices depending on the light requirements and the light output from any single emitter.

A substrate 103 supports the light emitter 102. The substrate 103 can be printed circuit board (PCB) or similar support for solid state devices such as the light emitter(s) 102. The substrate 103 has a main body that includes a first side 106 on which the light emitter 102 is fixed and a second side 108 opposite and remote from the first side 106. The first and second sides 106, 108 each have major surface area relative to the sides of the substrate 103. The substrate 103 can include a plurality of electrically and thermally conductive traces on the first side 106. A plurality of vias 110 may extend through the substrate from the first side 106 to the second side 108 in an example embodiment. The plurality of vias 110 can be filled with electrically and thermally conductive material. The thermally conductive material of the traces on the first side 106 and in the vias 110 can be a metal, e.g., copper or aluminum. The second side 108 can include a thin thermally conductive layer, which can be connected to the material in the vias 110 or thermally connected to the first side 106 of the substrate 103. The second side 108 can include a thin metal layer (e.g., copper, aluminum or alloys thereof), which can be connected to the material in the vias 110.

In an example embodiment, the substrate 103 is a metal substrate PCB composed of three layers, namely, the circuit layer (metal foil), insulation, and metal substrate. In an example, the metal can be copper or alloys thereof. In an example, the metal can be aluminum or alloys thereof. The circuit layer defines the first side 106 of the substrate 103. The insulation layer is the central body. The metal substrate defines the second side 108 of the substrate 103.

In an example embodiment, the substrate 103 is an assembly of at least three layers, namely, the top circuit layer (metal foil), a thermally conductive center layer, which can be electrically non-conductive, and a bottom thermally conductive layer. The bottom thermally conductive layer can be a metal film, metal plate or the like. In an example, the metal can be copper or alloys thereof. In an example, the metal can be aluminum or alloys thereof. The bottom thermally conductive layer forms the second side 108. The top layer defines the first side 106 of the substrate 103.

The light emitter 102 can include a heat transfer structure as part of its package that connects to thermally conductive components, e.g., the traces, on the first side 106 of the substrate 103. The light emitter 102 is electrically and mechanically connected to the circuit layer of the substrate 103.

The heatsink 104 is a passive heat exchanger that transfers the thermal energy generated by electronics (e.g., electronics in the light emitter 102) to a fluid medium, e.g., air or a liquid coolant, where the thermal energy is dissipated away from the electronics. This assists in regulating the electronics' temperature within an operational range. The heatsink 104 also operates to assist in keeping the electronics below their thermal budget. The heatsink 104 is thermally connected to optoelectronics such as lasers and light emitting diodes (LEDs) or other components in a light emitter 102, where the heat dissipation ability of the component itself is insufficient to moderate its temperature.

The heatsink 104 can be designed to maximize its surface area in contact with the cooling medium (e.g., air) surrounding it. Air velocity (e.g., from a blower 105), choice of material, protrusion design (e.g., fins) and surface treatment are factors that affect the performance of the heatsink. Heatsink attachment methods and thermal interface materials also affect the package temperature of the solid state light emitter 102. In an example, a thermal adhesive or thermal grease is positioned between the heatsink 104 and the substrate 103 to improve the heatsink's performance by filling air gaps between the heatsink 104 and the substrate 103 supporting the device 102 and allowing greater heat transfer from the substrate 103 to the heatsink 104. The heatsink 104 can be made out of a thermally conductive material and may include a metal, copper, aluminum, alloys thereof or compounds containing any of these examples. Aluminum heatsinks are used as a low-cost, lightweight alternative to copper heatsinks, but have a lower thermal conductivity than copper.

The heatsink 104 includes an aperture 107 therein. The aperture 107 is a void or opening in the body of the heatsink 104 that is open to the second side 108 of the substrate 103 and can expose the metal layer (e.g., copper layer) on the second side 108. The aperture 107 is defined by walls in the heatsink body. In an example embodiment, the aperture 107 exposes a portion of the second side 108 of the substrate 103, which is not covered. The aperture 107 can be aligned with the light emitter 102 on the first side 106. The aperture 107 is larger than the light emitter 102 in an example embodiment. In an example embodiment, the aperture 107 can be aligned with one or more of the vias 110 that are connected to the light emitter 102.

A blower 105 is provided in the housing 101 and includes a fluid inlet to draw in fluid and an outlet to vent fluid. In an example embodiment, the fluid is air. The blower 105 can be a DC fan, which may be driven by signals from control circuitry to drive a DC motor to rotate an impeller, which can include a plurality of curved blades to impart kinetic energy to the fluid. The blower 105 can be an axial fan. The blower 105 expels air to the heatsink 104 at a certain velocity and a volume as a function of time. The air forced into the heatsink 104 assists the passively operating heatsink 104 to draw thermal energy from the light emitter 102. The blower 105 additionally directs air through the aperture 107 directly onto the metal layer on the second substrate side 108. The blower 105 is fluidly engaged with the heatsink 104 to flow air through the heatsink 104 to remove thermal energy from the substrate 103.

In an example embodiment, at least a portion of the fluid is directed through the aperture 107 and flows to a second portion of the thermally conductive layer, e.g., a metal layer, that is free of thermal interface material (e.g., thermal adhesive or thermal grease).

In the example embodiment where the metal layer on the second side 108 of the substrate 103 has a higher thermal conductivity than the heatsink 104, the cooling fluid, e.g., air, directly contacting the second side 108 of the substrate 103 should draw thermal energy more efficiently than transferring the thermal energy from the substrate 103 to the heatsink 104 and then to the air being moved by the blower 105. That is, the thermal energy transfer from the more efficient material of the second side 108 of substrate 103 to the less efficient material of the heatsink 104 is reduced or removed. In an example embodiment, a thermal interface material, e.g., thermal paste, thermal grease, thermal gap filler, thermal adhesive, and the like, can be intermediate the substrate 103 and the heatsink 104. The thermal interface material can be coated on a first portion of the substrate 103 between a first portion and the plurality of fins (e.g., fins 204). In an example embodiment, the thermal interface material can be coated on the top surface of the plurality of fins, which contacts the second side 108 of the substrate 103. The thermal interface material operates to enhance the thermal coupling between the substrate 103 and the heatsink 104, which assists in heat dissipation.

In an example embodiment, at least a portion of the fluid is directed through the aperture 107 and flows to a second portion of the thermally conductive layer, e.g., a metal layer, that is free of thermal interface material. That is, a first portion of the substrate 103 may be covered and in mechanical contact with the fins 204. A second portion of the substrate 103 may be uncovered and free from mechanical contact with the fins 204.

The light assembly 100 can further include a reflector 128 optically connected to the light emitter 102. The reflector 128 receives light from the light emitter and directs the light in a desired direction. The reflector 128 can be mounted to the substrate 103 such that all of the light from the light emitter 102 is captured and directed toward a lens 109, which is optically connected to the reflector 128. The lens 109 can also be optically connected to the light emitter 102. The lens 109 can operate to direct the light in the direction it is desired. The lens 109 can refract the light output by the light emitter 102 and reflected by reflector 128 such that the light rays are directed in the desired direction.

The housing 101 can enclose both the reflector 128 and the lens 109. The housing 101 seal in the light except for a port defined by the outlet of the lens 109.

The aperture 107 in the heatsink 104 exposes the second side 108 of the substrate 103 to the fluid, e.g., air, driven by the blower 105. The aperture 107 can be axially aligned with the light emitter 102. A plurality of fins (e.g., fins 204) can extend outwardly from the aperture 107.

Figure 2:
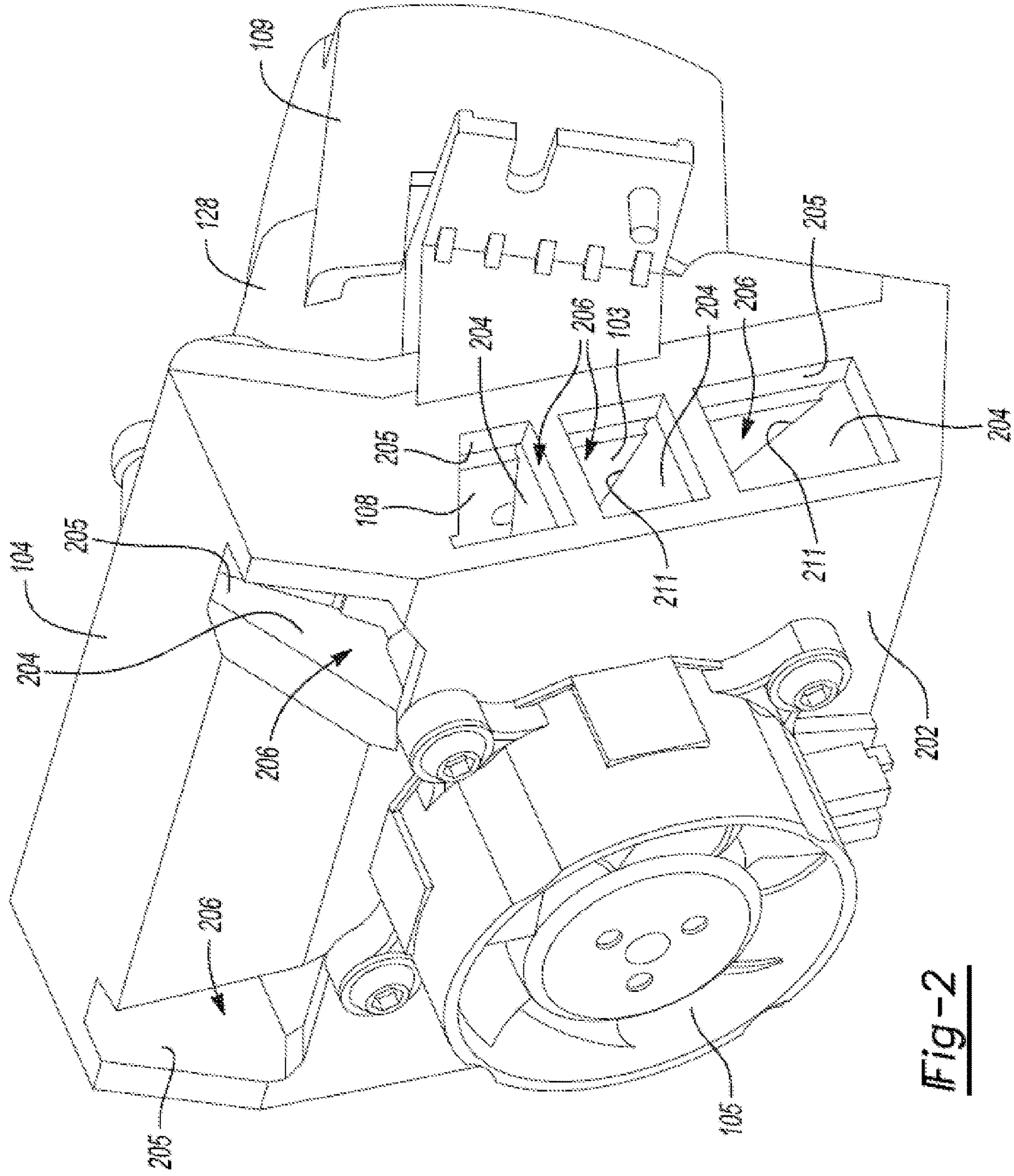
FIG. 2 shows a rear, top perspective view of a lighting assembly in accordance with the disclosure.
Figure 3:
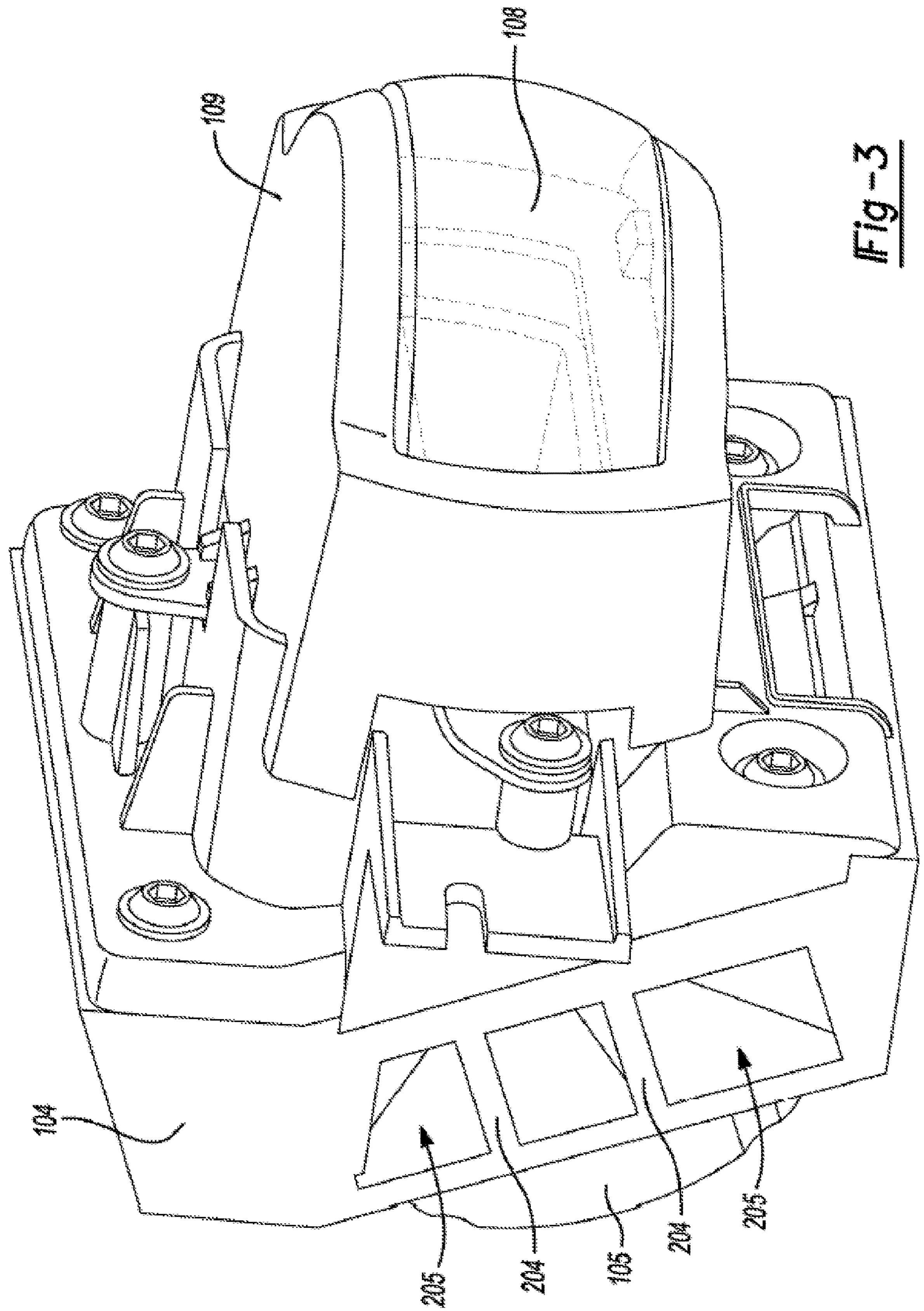
FIG. 3 shows a front, top perspective view of a lighting assembly in accordance with the disclosure.

FIGS. 2 and 3 illustrate a light assembly 200 in accordance with an example embodiment that is similar to the light assembly 100 with similar parts labelled with similar numbers. FIG. 2 shows a rear, top perspective view. FIG. 3 shows a front, top perspective view. A substrate 103 supports one or more light emitters 102 (not shown) that emit light into the reflector 128. The emitters 102 are mounted to a first side 106 of the substrate 103. The reflector 128 guides light to the lens 109, which directs the light output from the assembly 200. The heatsink 104 is mounted to the second side 108 of the substrate 103. The blower 105 is mounted to the heatsink 104.

The heatsink 104 includes a body including a base 202 to which the blower 105 is mounted and side walls extending from the periphery of the base 202. The base 202 is generally planar. The base and side walls of the heatsink 104 can be of a unitary construction from, e.g., a thermally conductive material such as a metal, an alloy, or a polymer. A fluid inlet is formed in the base 202, which receives air driven from the blower 105 in an example embodiment. A plurality of fins 204 are connected to and extend from the base 202 toward the substrate 103. The fins 204 include a ridge 211 remote from the base 202. At least one ridge 211 mechanically contacts the second side 108 of the substrate 103. In an example embodiment, one or more of the fins 204 contact the second side 108 of the substrate 103. The contact between the fins 204 and the second side 108 of the substrate 103 assists in the transfer of thermal energy from the substrate 103 to the heatsink 104.

The fins 204 are elongate and start adjacent the fluid inlet of the heatsink 104 and end adjacent fluid outlets 206, respectively. A plurality of fluid channels 205 are formed intermediate the fins 204. The fluid channels 205 are open to the air inlet and end at outlets 206 from which the air driven by the blower 105 exits the heatsink 104. The fluid channels 205 can define passages for the fluid to move from the aperture 107, across the substrate 103 and exit the outlets 206. The outlets 206 are formed by apertures in the body of the heatsink 104. In operation, the heatsink 104 draws thermal energy from the substrate 103 through contact therewith and being adjacent the substrate 103. The blower 105 forces fluid, e.g., air, through the plurality of channels 205. The fluid being forced into the fluid channels 205 by the blower 105 removes thermal energy from both the heatsink

104 and the substrate 103. The fluid can directly contact the second side 108 of the substrate 103, which can include a thin metal layer such as a copper layer. The blower 105 moves fluid, e.g., air, through the channels 205, which act as air passages, across the portion of the heatsink exposed between the fins 204.

The fins 204 can be a material, e.g., a metal or metal alloy, with a different thermal conductivity than the substrate, specifically the second side 108 of the substrate 103. In an example embodiment, the second side 108 of the substrate 103 has a higher thermal conductivity relative to the heatsink 104. In an example embodiment, the open area of the second side 108 of the substrate 103 that is not in contact with the fins 204 is greater than the contact area of the second side 108 of the substrate 103 that is in contact with the fins 204. The fluid traveling through the channels 205 directly contacts the substrate 103's second side 108 and directly removes some thermal energy therefrom without first transferring the thermal energy to the heatsink 104. The thermal energy being removed from the substrate 103's second side 108 directly by the fluid can be greater than the thermal energy being transferred to the heatsink 104's fins 204.

The plurality of channels 205 can be at least partly bound by a base 202 of the heatsink 104 and the second side 108 of the substrate 103.

Figure 4:
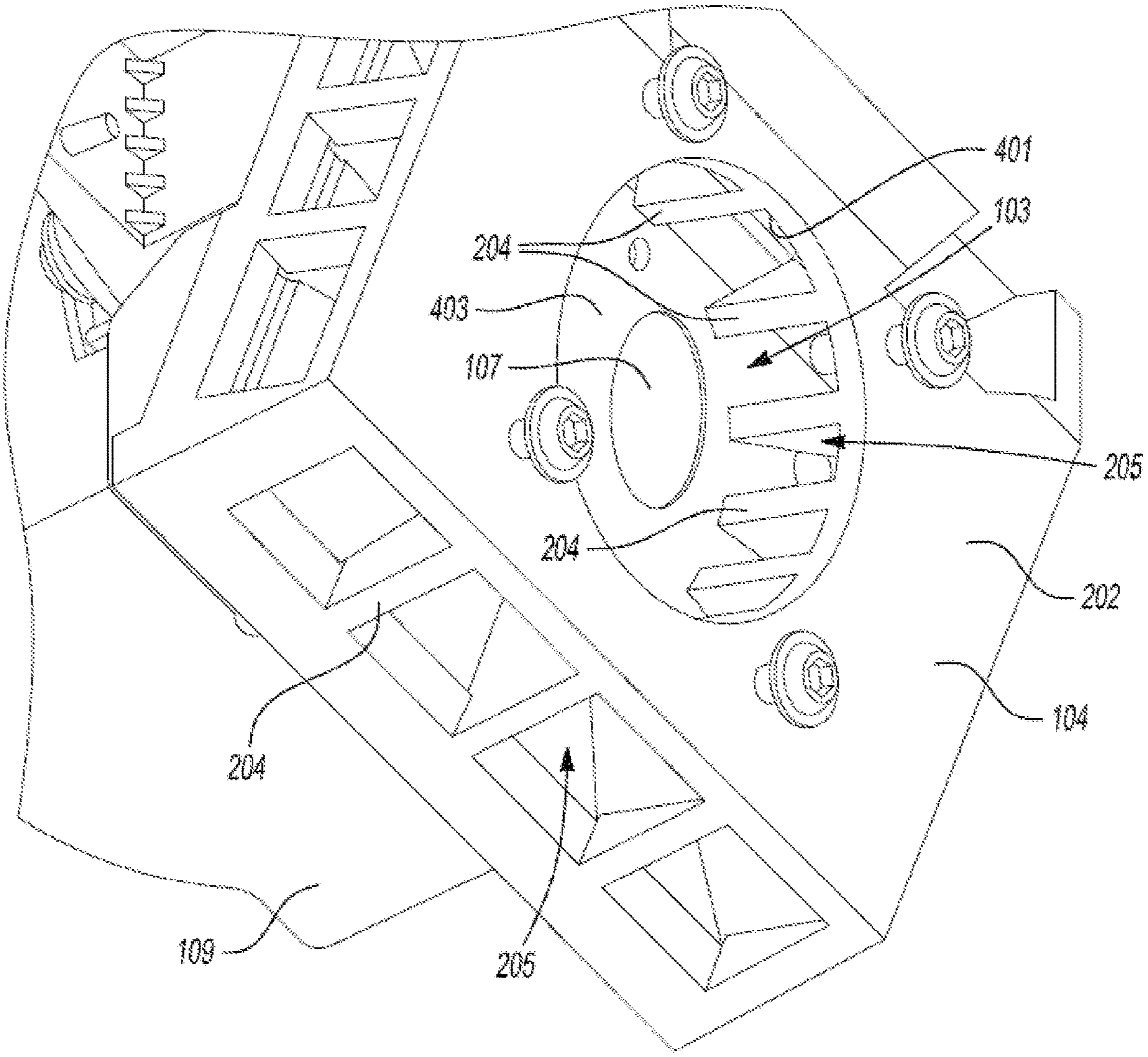
FIG. 4 shows a rear, bottom perspective view of a lighting assembly in accordance with the disclosure.

FIG. 4 shows a rear, bottom perspective view of the light assembly 200 that is similar to the light assembly 100 with similar parts labelled with similar numbers, but with the blower 105 removed to better illustrate the inlet 401 to the channels 205 and the fins 204 in the heatsink 104. For better illustration, not all of the channels 205 and the fins 204 are labeled in FIG. 4. As shown, there are four channels 205 exiting the side wall of the heatsink 104 at the bottom, left side of FIG. 4. The second side 108 of the substrate 103 is exposed to the channels 205. The open area 403 of the substrate 103's second side 108 being open to the channels 205 is greater than the area of the substrate 103's second side 108 being covered or contacted by the top surface of the fins 204.

In an example embodiment, the substrate 103 may include vias or bores 110 extending through the substrate 103 to the first side 106 directly beneath the light emitter(s) 102 that expose the bottom of the light emitter(s) 102 to the channels 205 or the inlet of heatsink 104. The first side 106 of the substrate 103 can remain environmentally sealed from the second side 108, which can receive air from the open environment via action of the blower 105.

Figure 5:
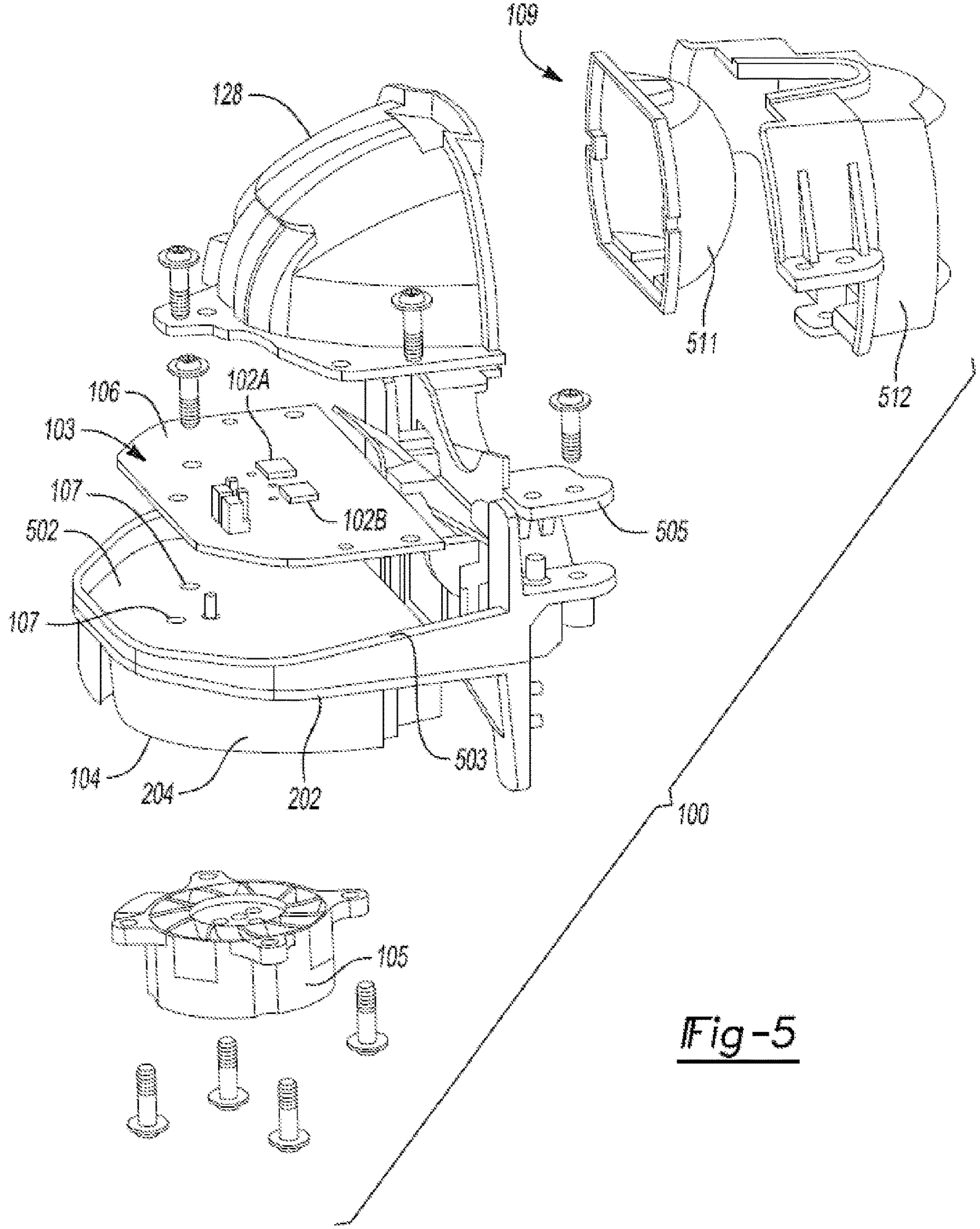
FIG. 5 shows an exploded view of a lighting assembly in accordance with the disclosure.

FIG. 5 shows an exploded view of an example embodiment of the light assembly 100 with similar parts labelled with similar numbers. A plurality of light emitters 102A, 102B are shown mounted on the first side 106 of the substrate 103. It is within the scope of the present disclosure to include a single light emitter 102 or a plurality of discrete light emitters 102 on the first side 106 of the substrate 103. The heatsink 104 in the FIG. 5 embodiment is mounted inverted relative to the embodiments shown in FIGS. 2-4 such that a top surface 502 of the heatsink 104 faces the bottom of the substrate 103. For example, the base 202 of the heatsink 104 is mounted to the substrate 103 such that the substrate 103's second side 108 is mounted on the base 202 of the heatsink 104. In an example, the heatsink base 202 is essentially covered on the top side (with reference to FIG. 5) by the conductive layer at the substrate 103's second side 108. A rim 503 extends around the periphery of the heatsink base 202. The substrate 103 can be fixed within the rim 503 when assembled.

A shutter 505 is provided to at least partially cover one or more of the light emitters 102 to control the light output from the light assembly 100.

The lens 109 includes a lens 511 and a lens cover 512. The lens 511 can be mounted to the lens cover 512, e.g., using a snap fit, a press fit, adhesive, or fastener, or combinations thereof. The lens cover 512 is fastened to the mount or to the shutter 505. In an example embodiment, the lens 109 is mostly sealed to the shutter 505 and reflector 128 to reduce light leaking in an unintended manner and prevent environmental contaminants from entering the interior of the light assembly.

Figure 6:
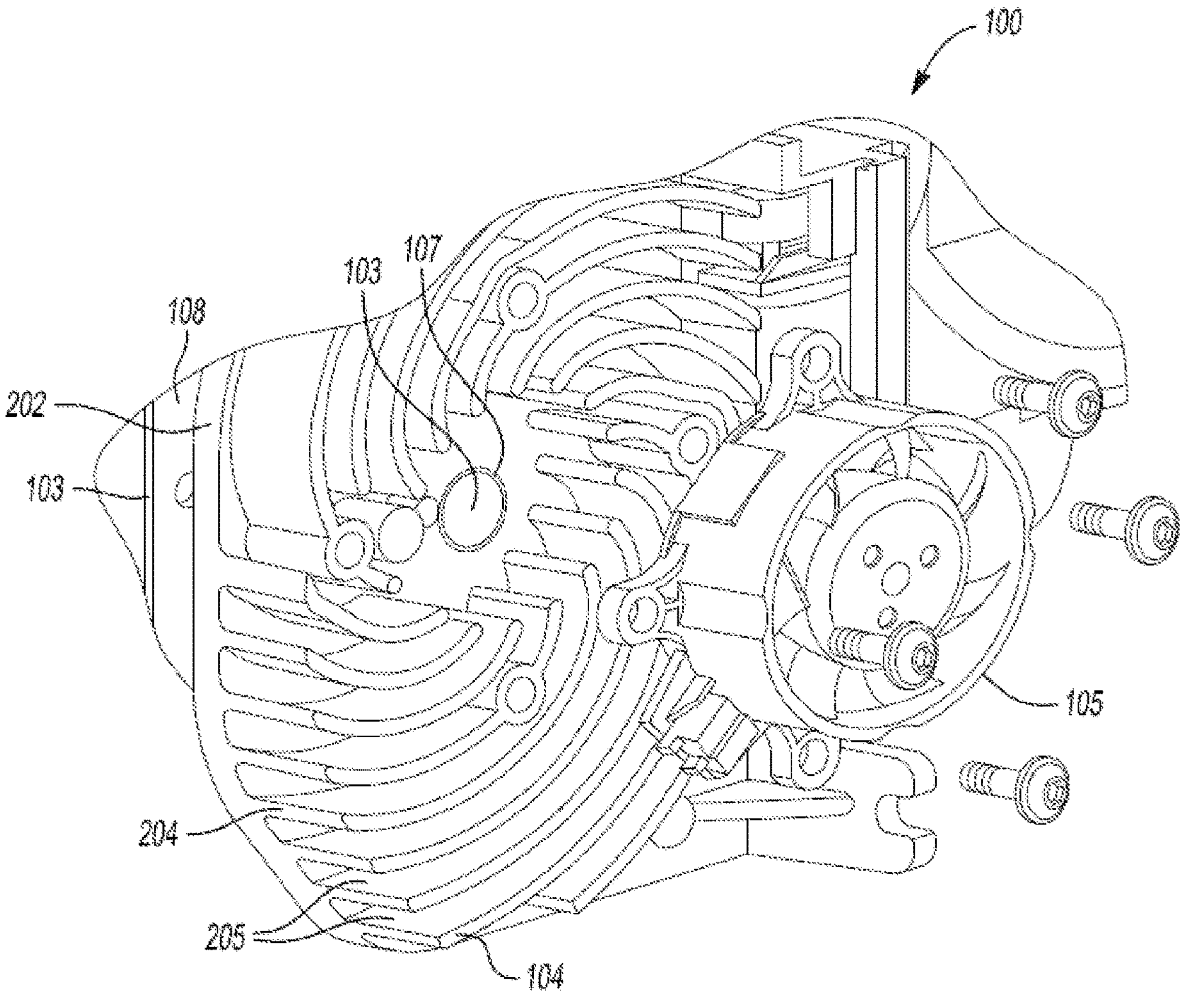
FIG. 6 shows a bottom, partial exploded view of a lighting assembly in accordance with the present disclosure.

FIG. 6 shows a bottom, exploded view of the light assembly 100. The blower 105 is adjacent the heatsink 104. The heatsink base 202 is adjacent the second side 108 of the substrate 103. An aperture 107 is positioned in the heatsink base 202 with the second side 108 of the substrate 103 being exposed through the aperture 107. The plurality of fins 204 extends from the center of the base 202 to the outer edge of the heatsink base 202. The fins 204 in the FIG. 6 embodiment are elongate and arcuate. Other fin shapes can be used that have different lengths and/or degrees of curvature. The fins 204 extend away from the substrate 103. The fluid channels 205 are between adjacent fins 204 with the center portion of the heatsink 104 being free of fins and at least partially open to the bottom, second side 108 of the substrate 103.

Figure 7:
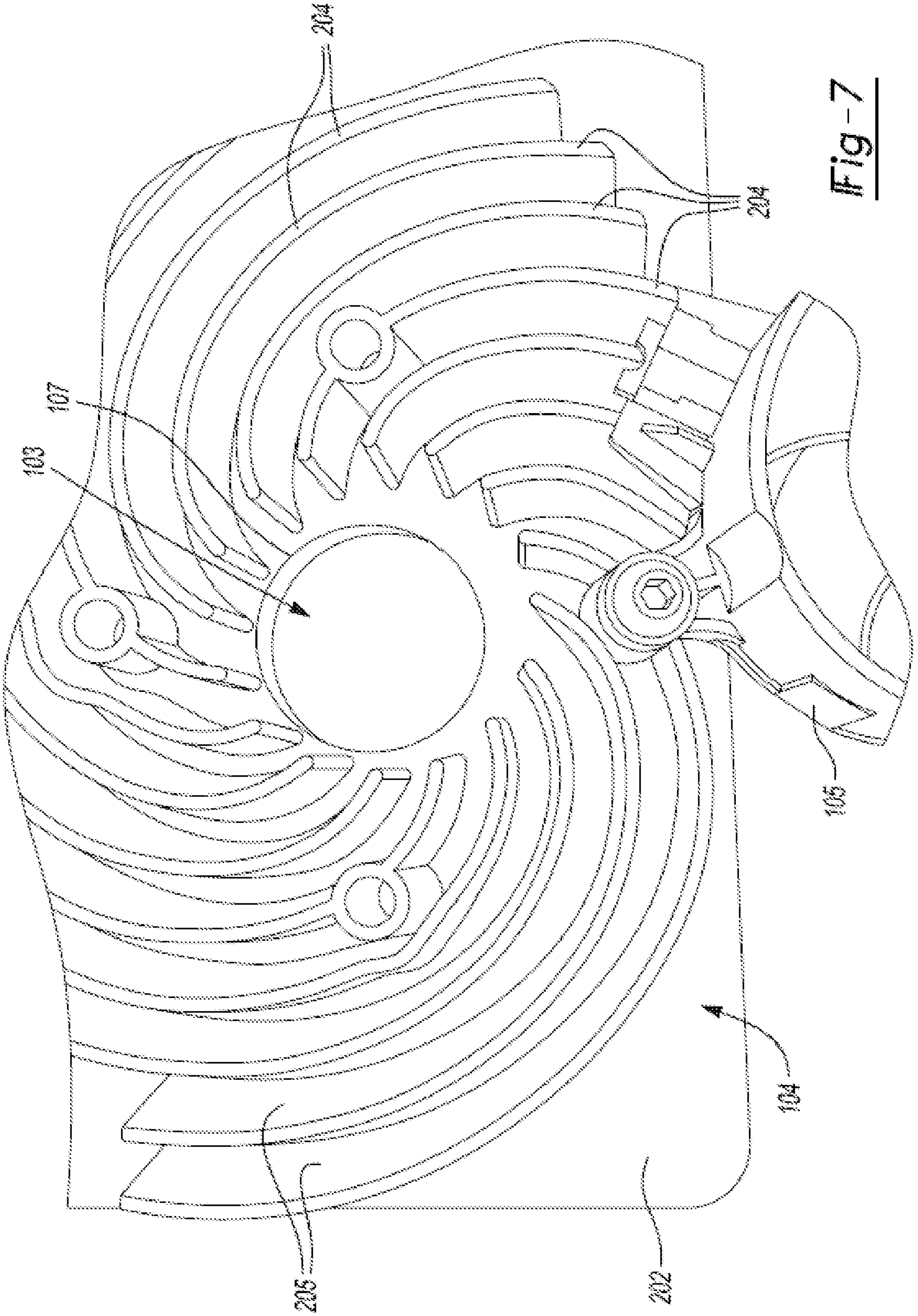
FIG. 7 shows a heatsink and substrate in accordance with the present disclosure.

FIG. 7 shows another bottom, exploded view of the light assembly 100 with the substrate 103, the heatsink 104, and the blower 105. The bottom, second side 108 of the substrate 103 is exposed through the heatsink aperture 107 in the heatsink base 202. The fins 204 extend distally away from the base 202 toward the blower 105 and therefore away from the substrate 103. The plurality of channels 205 are between adjacent fins 204. The fins 204 are elongate and arcuate to create a spiral structure. It is to be understood, however, that the fins can have different shapes and be deployed along the substrate 103 in different patterns than shown. The heatsink 104 is made from a material that has a thermal conductivity less than the outer material layer of the substrate 103, which is contacting the heatsink base 202. The blower 105 is shown for convenience and would be mounted over the aperture 107 in use.

Figure 8:
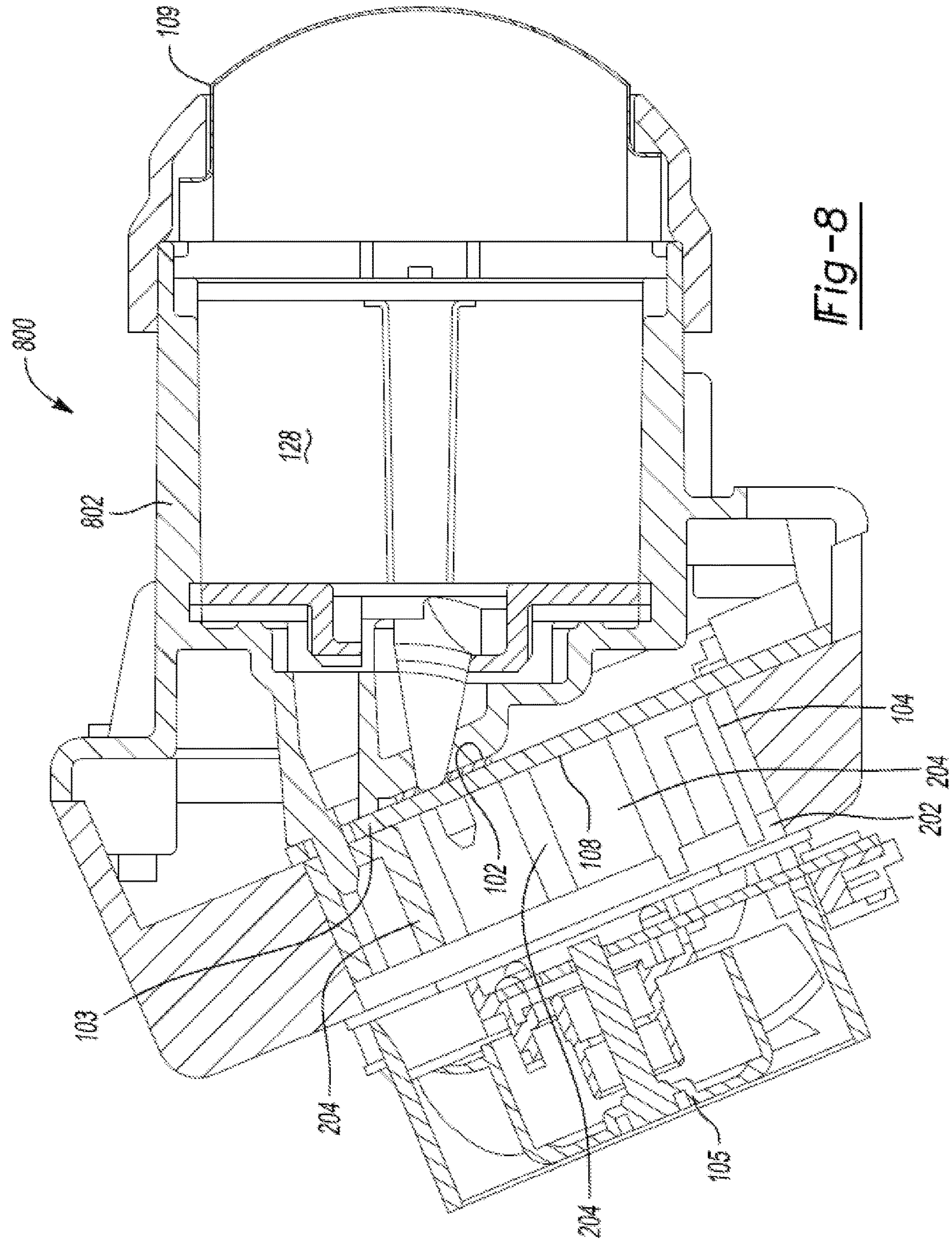
FIG. 8 shows a cross-sectional view of a lighting assembly in accordance with the present disclosure.

FIG. 8 shows a cross sectional view of a light assembly 800, which is an embodiment of the light assembly 100 with similar parts labelled with similar numbers. The substrate 103 supports the light emitter 102 that outputs light through a housing 802 and the lens 109. The housing 802 is opaque to the light emitted from the light sources 102. The heatsink 104 is mechanically connected to the second (left in FIG. 8) side 108 of the substrate 103. The fins 204 extend between the heatsink base 202 and the substrate second side 108. In an example embodiment, the fins 204 contact the substrate second side 108. In an example embodiment, the substrate second side 108 includes an outer layer with thermal conductivity greater than the material of the heatsink 104.

Figure 9:
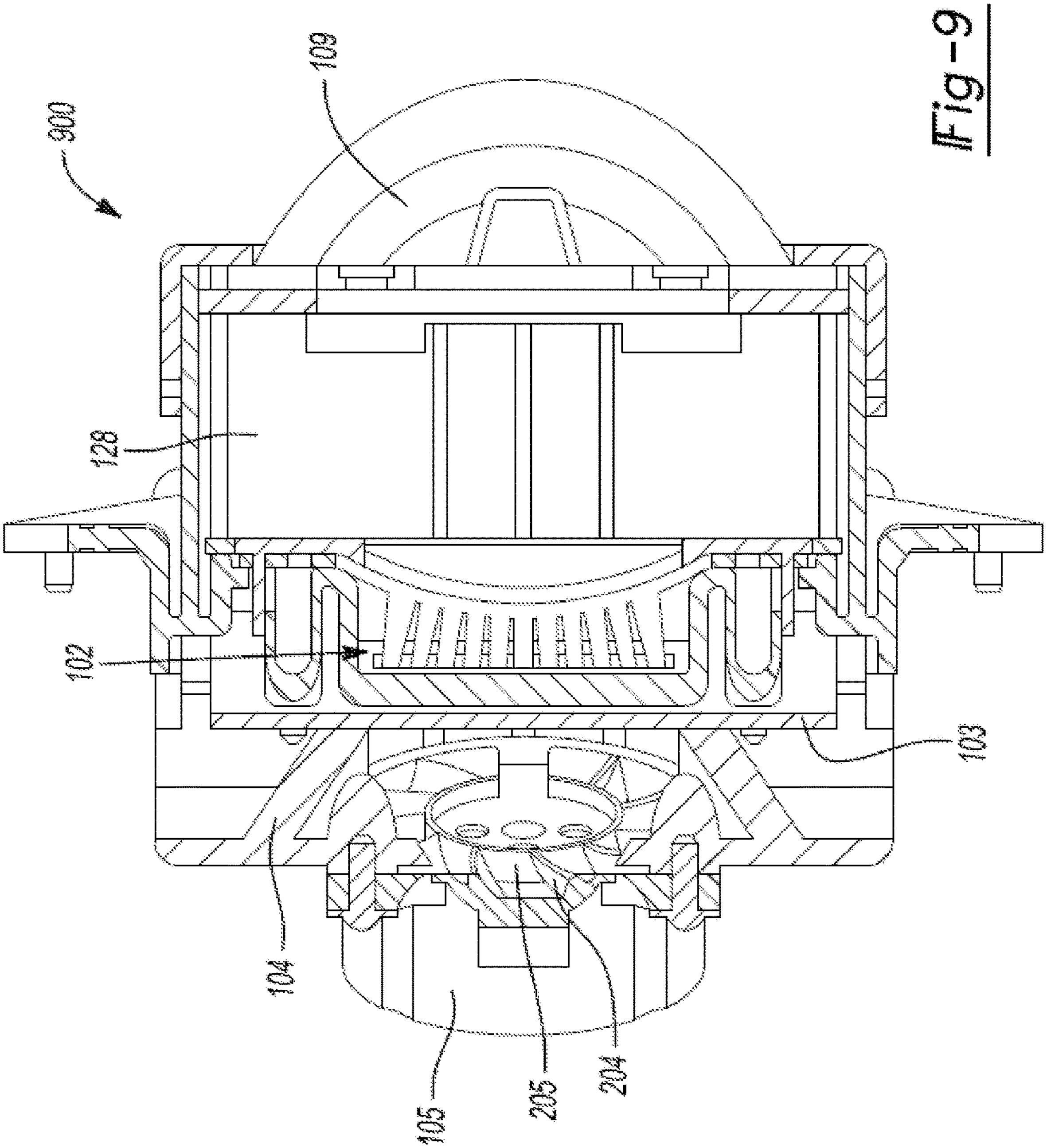
FIG. 9 shows a cross-sectional view of a lighting assembly in accordance with the present disclosure.

FIG. 9 shows a cross-sectional view of a light assembly 900, which is an embodiment of the light assembly 100 with similar parts labelled with similar numbers. The substrate 103 supports a plurality of light emitters 102 that outputs light through the housing 802 and the lens 109. The heatsink 104 is mechanically connected to the second (left in FIG. 9) side 108 of the substrate 103. The fins 204 extend between the heatsink base 202 and the substrate second side 108. In an example embodiment, the fins 204 contact the substrate second side 108. In an example embodiment, the substrate second side 108 includes an outer layer with thermal conductivity greater than the material of the heatsink 104.

Figure 10:
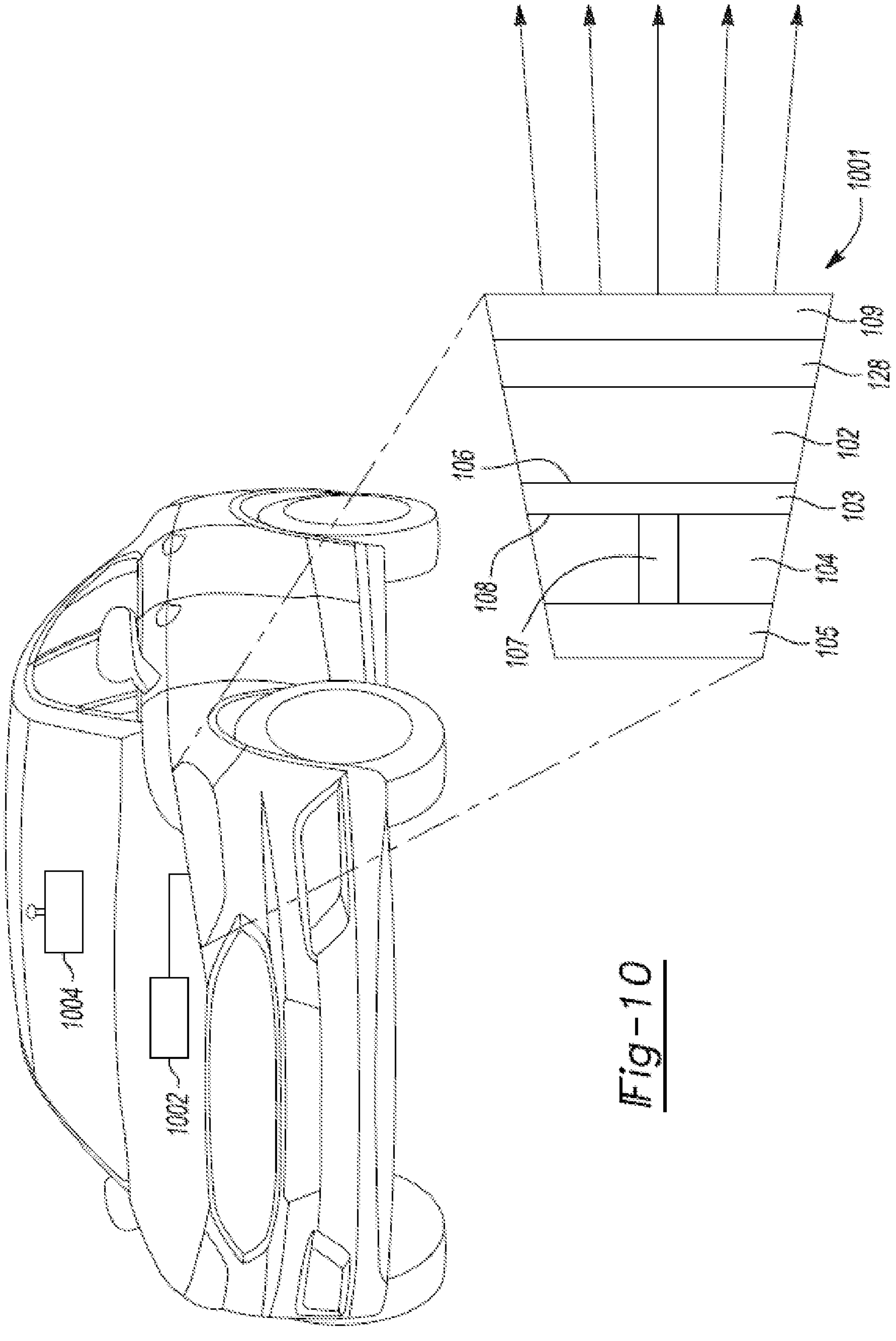
FIG. 10 shows a vehicle with a lighting assembly in accordance with the present disclosure.

FIG. 10 shows a vehicle 1000 with a headlamp assembly 1001 that is powered by an electrical source 1002. The electrical source 1002 can be a main battery connected to an alternator driven by an internal combustion engine. The electrical source 1002 can be a battery or capacitor powered by a traction battery or traction battery cell. The electrical source can operate to regulate the electrical signal turning on and/or powering the light emitter 102 and the blower 105. A light sensor 1004 can be provided to obtain information about glare or brightness detected in the forward travel path of the vehicle 1000 and used to control the headlamp assembly 1001.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom," and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

The foregoing description of the embodiments has been provided for purposes of illustration and description. It is not intended to be exhaustive or to limit the disclosure. Individual elements, assemblies/subassemblies, or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A vehicle lighting assembly, comprising:

at least one light emitter;

a substrate having a first side on which the at least one light emitter is mounted, and a second side remote from the first side and including a thermally conductive material;

a heatsink adjacent the second side of the substrate, the heatsink including a base defining a surface extending in a flat plane parallel to and spaced apart from the second side of the substrate with a thermal interface material disposed therebetween, the base defining an aperture exposing a portion of the second side of the substrate wherein the heatsink further includes a plurality of fins extending from the surface of the base, away from the substrate, and defining venting passages between adjacent fins of the plurality of fins; and a blower fluidly engaged with the heatsink to drive air through the heatsink, into the aperture, across the portion of the second side of the substrate and substantially entirely out through the venting passages between the plurality of fins.

2. The vehicle lighting assembly of claim 1, wherein the thermally conductive material includes at least one of: a metal film, a metal plate, copper, copper alloy, aluminum, and aluminum alloy.

3. The vehicle lighting assembly of claim 1, wherein the thermal interface material includes at least one of: a thermal paste, a thermal grease, a thermal gap filler, and a thermal adhesive.

4. The vehicle lighting assembly of claim 1, wherein the aperture is axially aligned with the light emitter that is positioned on the first side of the substrate.

5. The vehicle lighting assembly of claim 1, wherein the plurality of fins extend outwardly from the aperture.

6. The vehicle lighting assembly of claim 5, wherein the plurality of fins have an arcuate shape.

7. The vehicle lighting assembly of claim 1, wherein the light emitter is chosen from a light emitting diode, a high-intensity discharge lamp, a type of electrical gas-discharge lamp, and a laser emitter.

8. The vehicle lighting assembly of claim 1, wherein the substrate is a printed circuit board, and the light emitter includes a light emitter heatsink on the first side of the substrate and is connected to the second side through conductive components chosen from traces on the substrate and a via extending through the substrate from the first side to the second side.

9. The vehicle lighting assembly of claim 1, wherein the second side of the substrate has a higher thermal conductivity than the heatsink.

10. The vehicle lighting assembly of claim 1, further comprising: a reflector mounted at the first side of the substrate and adapted to direct light from the light emitter; and a lens configured to receive light from the reflector and output light therefrom.

11. A vehicle lighting assembly, comprising:

at least one light emitter;

a substrate having a first side on which the at least one light emitter is mounted, and a second side remote from the first side and including a thermally conductive material; and a heatsink adjacent the second side, the heatsink including a base defining a surface extending in a flat plane parallel to the second side of the substrate, the base defining an aperture exposing a portion of the second side of the substrate, wherein the heatsink includes a plurality of fins extending from the surface of the base and defining venting passages between adjacent fins of the plurality of fins; and a blower fluidly engaged with the heatsink to drive air through the heatsink, into the aperture, across the portion of the second side of the substrate, and substantially entirely out through the venting passages between the plurality of fins.

12. The vehicle lighting assembly of claim 11, wherein the aperture is axially aligned with the light emitter that is positioned on the first side of the substrate.

13. The vehicle lighting assembly of claim 11, wherein the heatsink includes a plurality of fins extending outwardly from the aperture and a plurality of channels intermediate the plurality of fins.

14. The vehicle lighting assembly of claim 13, wherein the plurality of fins have an arcuate shape.

15. A vehicle headlamp assembly comprising:

a printed circuit board (PCB) having a first side and a second side opposite the first side;

at least one light emitting diode (LED) mounted to the first side of the PCB and configured to emit light; and a heatsink contacting the second side of the PCB and configured to dissipate heat generated by the LED, the heatsink including a base defining a surface extending in a flat plane parallel to the second side of the PCB, the base defining an aperture exposing a portion of the second side of the PCB, wherein the heatsink further includes a plurality of fins extending from the surface of the base, away from the substrate, and defining venting passages; and wherein the plurality of fins are arcuate and extend both circumferentially and radially along the surface of the base.

16. The vehicle headlamp assembly of claim 15, wherein the vehicle headlamp assembly further comprises a fan including an inlet and an outlet, wherein the outlet of the fan is configured to direct the discharged air through the aperture towards the second side of the PCB and through the venting passages.

17. The vehicle headlamp assembly of claim 15, wherein the plurality of fins are arranged to originate from positions along a periphery of the aperture and extend toward a periphery of the base.

18. The vehicle headlamp assembly of claim 15, further comprising metal positioned on a substantial portion of the second side of the PCB, and a thermal interface material disposed between a first portion of the metal between the first portion and the heatsink.

19. The vehicle headlamp assembly of claim 18, wherein the thermal interface material includes at least one of: a thermal paste, a thermal grease, a thermal gap filler, and a thermal adhesive.

* * * * *